J. Clifton,

Subsoil Plow.

No. 110,550. Patented Dec. 27, 1870.

Witnesses

Inventor.
Josiah Clifton

UNITED STATES PATENT OFFICE.

JOSIAH CLIFTON, OF GEORGETOWN, TEXAS.

IMPROVEMENT IN PLOWS.

Specification forming part of Letters Patent No. 110,550, dated December 27, 1870.

*To all whom it may concern:*

Be it known that I, JOSIAH CLIFTON, of Georgetown, in the county of Williamson, and in the State of Texas, have invented certain new and useful Improvements in Plows; and I do hereby declare that the following is a full, clear, and exact description thereof, reference being had to the accompanying drawings, and to the letters of reference marked thereon, making a part of this specification.

The nature of my invention consists in the construction and arrangement of a "subsoiler-plow," as will be hereinafter set forth.

In order to enable others skilled in the art to which my invention appertains to make and use the same, I will now proceed to describe its construction and operation, referring to the annexed drawings, in which—

Figure 1:
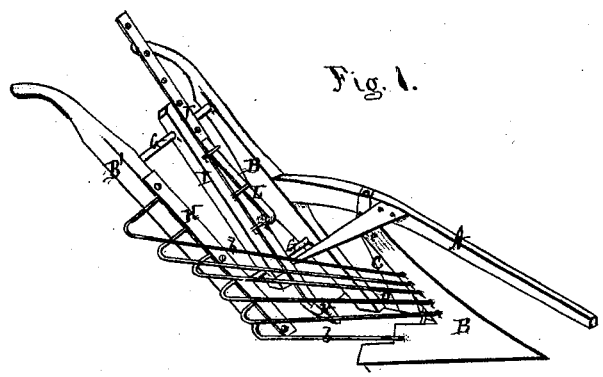
Figure 2:
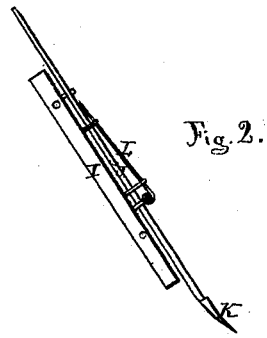

Figure 1 is a perspective view of my entire plow, and Fig. 2 is a side view of the subsoil attachment thereto.

A represents the plow-beam, attached at its rear end to the left handle, B.

At a suitable point on the under side of the beam A is a mortise or recess, in which is inserted a bar, C, through which passes a pin. This pin also passes through the ends of a metal strap, *a*, which goes around the beam, the beam resting upon said pin. The landside D is attached to the lower end of the bar C, as well as to the lower end of the left handle, B. The share E is attached to the front end of the landside and at the upper end of the bar C, as shown in Fig. 1.

From the share E a series of rods, *b b*, extend outward and toward the rear, forming the mold-board of the plow. The rear ends of the rods *b b* are bent, as shown in Fig. 1, and passed through or in grooves in the front side of the right handle, B', which is connected with the left handle, B, by rounds G G. The ends of the rods *b b* are held in the grooves on the handle B' by means of a metal bar, H, covering them on the front side of the handle, as shown.

On the rounds G G, between the handles B B', is placed a beam, I, near the upper end of which is a pin projecting through a hole in a bar, J. At the lower end of this bar is welded the subsoil-plow K, of any suitable construction, the bar J being held in place by staples, as shown, and pressed to the beam by a spring, L.

The bar J having a number of holes, the subsoiler may be raised or lowered at will, so as to make the furrow any depth required.

Having thus fully described my invention, what I claim as new, and desire to secure by Letters Patent, is—

The arrangement of the beam A, handles B B', bar C, landside D, share E E, rods *b b*, rounds G G, beam I, bar J, with plow K, and spring L, all substantially as shown and described.

In testimony that I claim the foregoing I have hereunto set my hand this 17th day of May, 1870.

JOSIAH CLIFTON.

Witnesses:
W. S. DALRYMPLE,
J. M. PAGE.